(12) United States Patent
Bach et al.

(10) Patent No.: US 11,614,135 B2
(45) Date of Patent: Mar. 28, 2023

(54) COLD-WORKED BRAKE PISTON

(71) Applicants: Continental Teves AG & Co. oHG, Frankfurt (DE); Erdrich Umformtechnik GmbH, Renchen-Ulm (DE)

(72) Inventors: Uwe Bach, Niedernhausen (DE); Uwe Zeibig, Achern (DE); Matthias Müller, Oberkirch (DE); Ulrich Lorenz, Sömmerda (DE); Rico Bauersfeld, Kannawurf (DE)

(73) Assignees: CONTINENTAL AUTOMOTIVE TECHNOLOGIES GMBH, Hannover (DE); ERDRICH UMFORMTECHNIK GMBH, Renchen-Ulm (DE)

( * ) Notice: Subject to any disclaimer, the term of this patent is extended or adjusted under 35 U.S.C. 154(b) by 128 days.

(21) Appl. No.: 16/619,398

(22) PCT Filed: May 16, 2018

(86) PCT No.: PCT/EP2018/062751
§ 371 (c)(1),
(2) Date: Dec. 4, 2019

(87) PCT Pub. No.: WO2018/224271
PCT Pub. Date: Dec. 13, 2018

(65) Prior Publication Data
US 2020/0182319 A1    Jun. 11, 2020

(30) Foreign Application Priority Data

Jun. 9, 2017 (DE) .......................... 102017209761.2
Aug. 21, 2017 (DE) .......................... 102017214540.4

(51) Int. Cl.
*F16D 55/228* (2006.01)
*F16D 65/18* (2006.01)
(Continued)

(52) U.S. Cl.
CPC .............. *F16D 65/18* (2013.01); *B23P 15/10* (2013.01); *C21D 7/02* (2013.01); *C21D 2221/00* (2013.01);
(Continued)

(58) Field of Classification Search
CPC .. F16D 2125/06; F16D 2250/00; F16D 65/18; B23P 15/10; C21D 7/02; C21D 2221/00
See application file for complete search history.

(56) References Cited

U.S. PATENT DOCUMENTS 6,382,367 B1    5/2002  Varzescu et al.
2004/0216604 A1  11/2004  Bennett et al.
(Continued)

FOREIGN PATENT DOCUMENTS

CN    1786506 A    6/2006
CN    101346555 A   1/2009
(Continued)

OTHER PUBLICATIONS

Machine translation of JP 63043736 (no date).*
(Continued)

*Primary Examiner* — Nicholas J Lane
(74) *Attorney, Agent, or Firm* — Hamilton, Brook, Smith & Reynolds, P.C.

(57) ABSTRACT

The invention relates to a brake piston 1 for a brake caliper 9 of a disk brake, which is produced using working processes from a metallic material, in particular from a flat metal sheet, and is formed in one piece as a unilaterally open pot with a piston longitudinal axis A, with a piston wall 2 and with a piston head 3. There is a need for robust and light
(Continued)

as well as alternatively constructed, efficiently producible and well guided brake pistons. The object is achieved firstly in principle on the basis of a cup-shapedly worked brake piston blank 19, in that at least one locally defined, i.e. partially cold-upset or partially ironed, cylindrical piston wall portion is present with a partially deformed piston wall 2 which is configured in adaptively modified manner by plastic material deformation by means of material redistribution (flow) including strain-hardening of its piston wall thickness of sl−x.

16 Claims, 6 Drawing Sheets (51) Int. Cl.
  B23P 15/10 (2006.01)
  C21D 7/02 (2006.01)
  F16D 121/04 (2012.01)
  F16D 125/06 (2012.01)

(52) U.S. Cl.
  CPC ...... *F16D 2121/04* (2013.01); *F16D 2125/06* (2013.01)

(56) References Cited

U.S. PATENT DOCUMENTS

| | | | |
|---|---|---|---|
| 2005/0034598 | A1 | 2/2005 | Ribeiro et al. |
| 2017/0175836 | A1* | 6/2017 | Iwai ........................ F16D 65/18 |
| 2018/0298969 | A1* | 10/2018 | Demorais ............. F16D 65/183 |

FOREIGN PATENT DOCUMENTS

| | | |
|---|---|---|
| CN | 101855466 A | 10/2010 |
| CN | 103268394 A | 8/2013 |
| CN | 105041918 A | 11/2015 |
| CN | 204942338 U | 1/2016 |
| CN | 105745463 A | 7/2016 |
| CN | 106337895 A | 1/2017 |
| DE | 39 43 106 A1 | 7/1991 |
| DE | 10 2005 061 354 A1 | 6/2007 |
| DE | 10 2013 223 962 A1 | 5/2015 |
| DE | 10 2015 208 732 A1 | 7/2016 |
| DE | 11 2015 003 522 T5 | 4/2017 |
| EP | 2 304 265 | 4/2011 |
| EP | 2728215 A1 | 5/2014 |
| JP | S53-95156 | 8/1978 |
| JP | S56 90130 A | 7/1981 |
| JP | 63043736 A * | 2/1988 ............. F16D 65/14 |
| JP | 2000-218336 A | 8/2000 |
| JP | 2014057999 A | 4/2014 |
| WO | 0177547 A1 | 10/2001 |
| WO | 2015/074905 A1 | 5/2015 |
| WO | 2016/017213 A1 | 2/2016 |
| WO | WO 2016/165897 A1 | 10/2016 |

OTHER PUBLICATIONS

English translation of Search Report for International Application No. CN 2018800379368, filed May 16, 2018, entitled Cold-Worked Brake Piston, consisting of 3 pages, dated: Aug. 21, 2020; dated Sep. 15, 2020.

Jensrud, O. et al.; "Cold forging of high strength aluminum alloys and the development of new thermomechanical processing," Journal of Materials Processing Technology; Elsevier; vol. 80-81; Aug. 1998; ISSN 0924-0136; 5 pages.

International Search Report and Written Opinion dated Dec. 13, 2018 for International Application No. PCT/EP2018/062751; Entitled "Cold-Worked Brake Piston"; 11 pages.

* cited by examiner

COLD-WORKED BRAKE PISTON

This application is the U.S. National Stage of International Application No. PCT/EP2018/062751, filed May 16, 2018, which designated the U.S., published in German, and claims priority under 35 U.S.C. § 119 or 365(c) to German Application No. 10 2017 209 761.2 filed Jun. 9, 2017, and German Application No. 10 2017 214 540.4 filed Aug. 21, 2017. The entire teachings of the above applications are incorporated herein by reference.

The invention relates to a cold-worked brake piston, preferably with interface arrangement for a parking brake, having the features of the preamble of claim 1.

Pot-shaped, unilaterally open brake pistons with piston head and piston wall and suitable interface arrangement for use for service brake calipers of disk brakes are fundamentally known. These pistons are obtained by working, i.e. they are not simply cast and machined but rather they are obtained by working processes such as extrusion or deep drawing. Due to independent centers of gravity and development aims, brake pistons for service brakes are unsuitable for repurposed use for parking brake calipers capable of combined actuation. For example, the piston interior thereof is optimized for engagement and fixing in position of a friction lining retaining spring, wherein any interface for a parking brake mechanism is absent.

EP 2 304 265 B1 discloses a worked, strain-hardened parking brake piston of steel material and of multipart construction with the aim of use for a parking brake caliper capable of combined actuation, which is substantially configured as a unilaterally open, pot-type hollow cylinder comprising a head and, in one piece thereon, a piston wall with a groove, wherein braking pressure coming from the interior of the pot can be applied to the head, such that an outwardly oriented contact surface of the head may be pressed against a brake pad, and wherein the pot interior accommodates a cup as pressure piece, which is involved in a force flow from a parking brake mechanism, a threaded nut being supported indirectly via the pressure piece against the head for the purpose of force transmission via a conical face. Accordingly, the brake piston system has an additional interface arrangement for interaction with a parking brake mechanism, in addition to its interfaces with the service brake. A piston wall of the piston to this end has a receptacle for the pressure piece, which is arranged secured against rotation in the piston. One advantage of this known solution is substantially embodied in the pressure piece, which on the one hand relieves the load on the piston wall and on the other hand enables a modular piston system. Known cupping methods require high levels of effort and/or suffer from the disadvantage that they fundamentally go hand in hand with a gradual reduction in wall thickness (relative to the original sheet thickness), a piston head in principle having the thickest wall thickness of the piston system, and the piston wall being reduced relative thereto, namely shaped by ironing. Accordingly, the achieved shaping freedom is disproportionately limited at acceptable levels of effort.

Because there is currently a need for alternative brake pistons of functionally improved configuration, the object of the present invention is to present a brake piston which can be represented as particularly efficiently cold-worked and which additionally has smoother force flow over its interfaces in interaction with its piston guide, and also has an increased load bearing capacity, or a reduced weight with a sufficient load bearing capacity. The object likewise extends to the provision of suitable working methods or toolmaking for application/interaction for a microprocessor-assisted (stroke, force, and or speed variation) mechanical or hydraulic press.

The object is achieved firstly with a brake piston, in principle without a special pressure piece, and in non-cutting manner, on the basis of a partially cold-upset, or ironed, cylindrical piston wall portion, which is present with a partially deformed piston wall which is configured in an adaptively modified manner by plastic material deformation by means of material redistribution (flow) including strain-hardening in its wall thickness of sl–x (relative to the original material/sheet thickness s0). The invention accordingly enables free working, including repeated changes between thin and thick passages with free wall thickness configuration, without being tied to the principles of irreversible gradual wall thickness reduction during working (such as in particular through reduction of the wall thickness in deep drawing: thick>thin). One advantage of the invention consists in the fact that it is multipurpose in application, and is thus also suitable for application in parking brake pistons.

In this respect, in one preferred embodiment the invention primarily relates to partially thickened wall thickness regions (relative to an original material/sheet thickness s0), a) a piston wall being drawn in a cylindrically smooth manner and groove-free in one piston wall portion in a locally defined manner through axially directed compressive and/or tensile stress in such a way that b) a piston wall forms a wall bracket shaped in one piece in the piston wall portion, which bracket extends interruptedly or uninterruptedly annularly peripherally and radially inwardly towards the piston longitudinal axis in such a way that c) the piston wall thickness is increased by a multiple in the piston wall portion of the wall bracket in a locally defined manner in relation to piston wall thicknesses of laterally neighboring (laterally offset) adjoining piston wall portions. A particular advantage of brake pistons according to the invention consists in the light and robust structure thereof with streamlined production in conjunction with improved load-carrying capacity in cooperation with the piston guide system. The focus here is on a particularly stress-appropriately locally defined piston wall thickening efficiently produced in the form of a belt, which arises through material displacement and redistribution (flow) from the free peripheral zone of the piston wall. The thickening is ideally suited to efficiently absorbing stress concentrations and stress maxima in the piston wall, in accordance with the laws of Barlow's formula. The corresponding working method substantially comprises at least one method step wherein the piston wall is pressure-clamped in the axial direction parallel to the brake piston longitudinal axis to generate a triaxial stress state. This leads to the displacement of material volume V in the direction V'.

An alternative production process according to the invention, which likewise incorporates non-cutting displacement of the material volume, extends to a particular internal roller-burnishing method. This comprises a roller-burnishing tool, which is mounted freely rotatably and moreover preferably firmly off-center in the workspace. A cup-shaped brake piston blank is clamped externally in a rotatably driven clamping device. It is proposed that the clamping device perform not only the drive rotational motion but also the advance motion and the infeed motion in relation to the roller-burnishing tool. In a further alternative, it is however conceivable for the roller-burnishing tool to be responsible for performing the advance motion and/or the infeed motion while the brake piston blank rotates.

The lightweight concept according to the invention is contributed to if the unthickened, i.e. simple, piston wall thickness is in each case laterally adjacent the piston wall thickening. In other words, the two piston wall portions, which are arranged offset laterally to the side of the thickened wall bracket, are reduced in regard to wall thickness. Furthermore, the piston wall thickness in the two piston wall portions offset laterally to the sides is substantially identically matching.

An efficient structure is obtained if the thickened wall bracket additionally incorporates the interface for the parking brake actuator system. Self-centering characteristics are obtained with reduced notch effect impact with largely minimized additional material costs if each wall bracket exhibits conicity over at least one flank. Alternatively or in addition thereto, this is possible with gradually changing fatigue limits if the wall bracket exhibits convexity over one flank.

Laterally to the side of the thickened wall bracket, and offset in the direction of the piston head, a stiffening element may be provided for rigid stabilization in the region between piston head and piston wall. By way of example, this stiffening element comprises a radially inwardly roller-burnished groove, which in conjunction with a simple, unthickened piston wall thickness is impressed into the piston wall in such a way that the piston wall describes a meandering, radially inwardly wound protrusion towards the piston longitudinal axis.

System ventability is positively assisted if the thickened wall bracket and the protrusion in the radial direction respectively project to different depths towards the piston longitudinal axis into the piston interior. In this connection, the protrusion is preferably of smaller configuration than the wall bracket.

The process technology therefore gets on the basis of the features of independent claims, which concurrently relate, independently of the brake piston as primary product, i.e. separately from the product claim, very sensible methods and devices for carrying out the novel working processes.

Further features, advantages and effects of the invention are revealed by subclaims in connection with the description on the basis of the drawings, in which:

Figure 1:
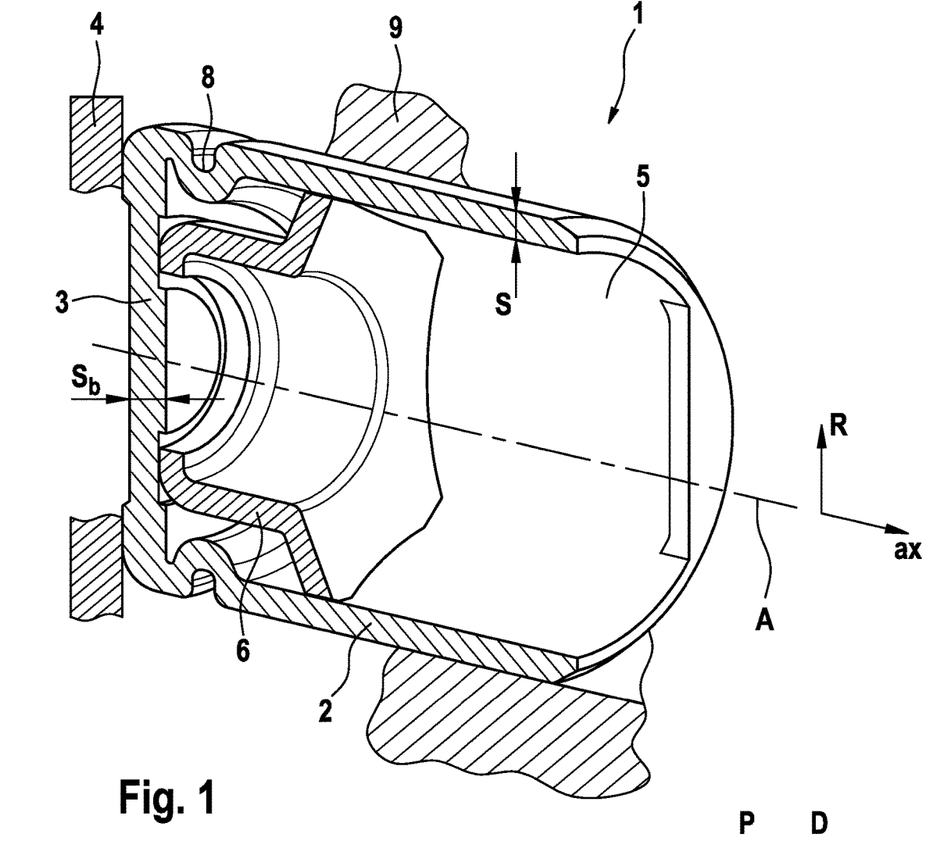
FIG. 1 shows as a basic explanation a known parking brake piston according to EP 2 304 265 B1, enlarged and in perspective and sectional view.

With regard to FIG. 1, to simplify understanding and also to avoid unnecessary complete repetition, the description of EP 2 304 265 B1 is hereby incorporated in its entirety, such that, due to this incorporation, a rudimentary list of the known interrelationships will suffice.

A brake piston 1 according to FIG. 1 is produced using working processes from a metallic material, such as for example a flat metal sheet with a wall thickness of s0, and configured in one piece as a unilaterally open pot with a piston longitudinal axis A, with a piston wall 2 and with a piston head 3. The piston head 3 serves in multiple (threefold) respects as an interface. On the one hand, the piston head 3 may be applied with an axial contact surface against a back plate 4 of a symbolically depicted brake pad. On the side arranged diametrically opposite, the piston head 3 defines with the piston interior 5 a hydraulic pressure chamber and the parking brake actuator system likewise acts on the piston head 3. To this end, a separate, thin-walled cup 6 with a conical face is provided in the piston interior 5, and is configured in two pieces with the brake piston 1. The cup 6, like the brake piston 1, is produced using working processes from a metallic material, such as in particular from a flat metal sheet. The piston wall 2 has a uniform wall thickness s. The piston head 3 is embodied with a gradually thickened wall thickness sb compared with the piston wall 2.

Figure 2:
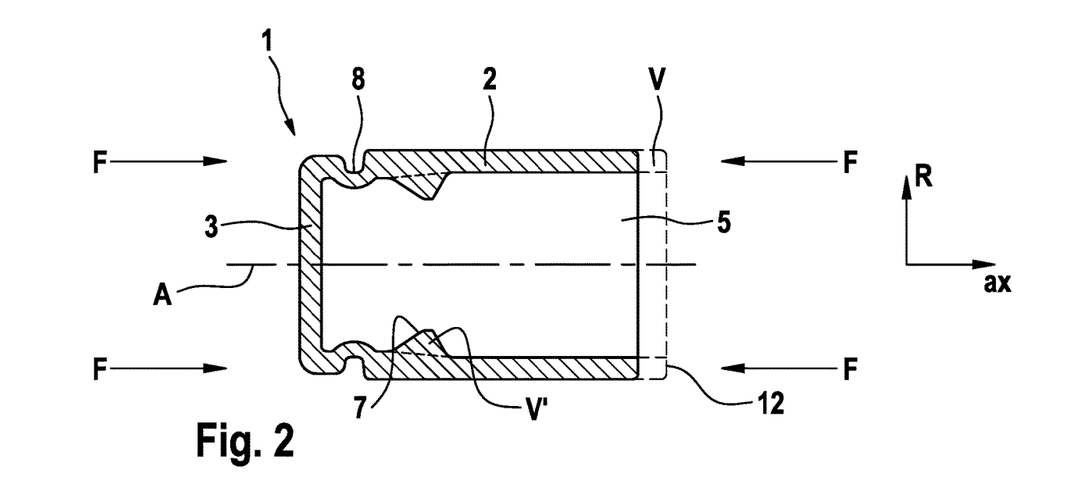
FIG. 2 is a roughly true to scale longitudinal section through one embodiment of the brake piston according to the invention.
Figure 3:
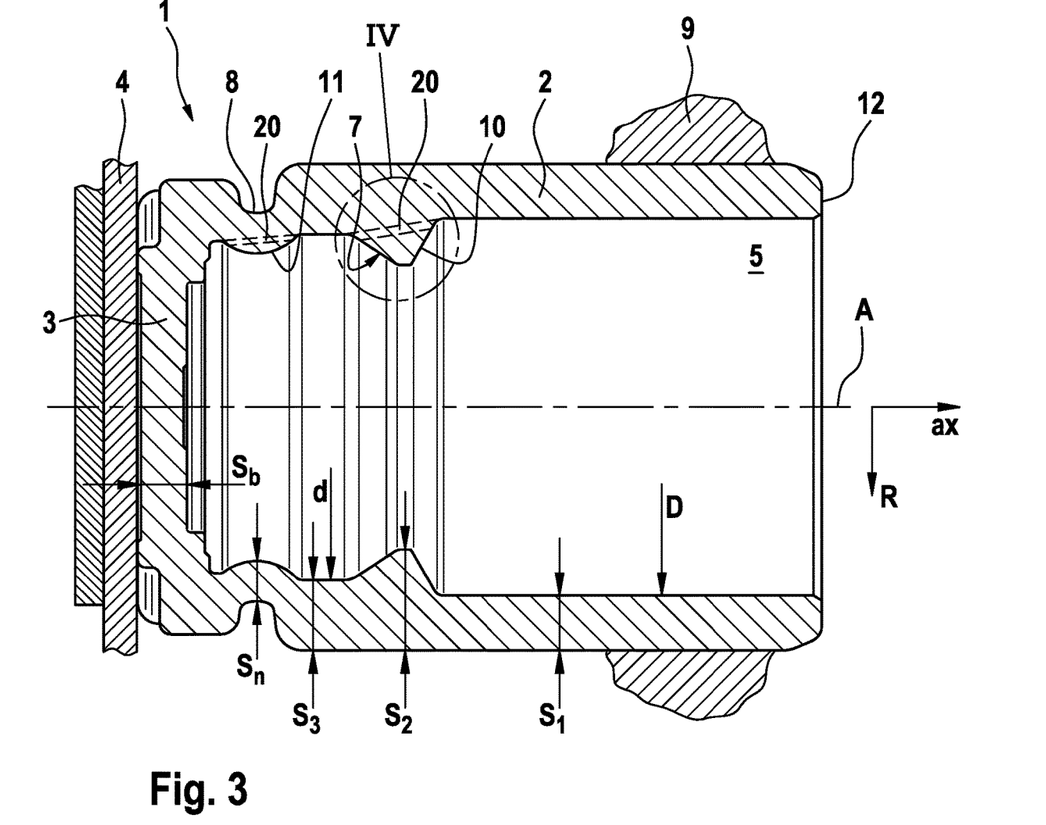
FIG. 3 shows a piston longitudinal section as in FIG. 2, enlarged roughly 2.5 times.
Figure 4:
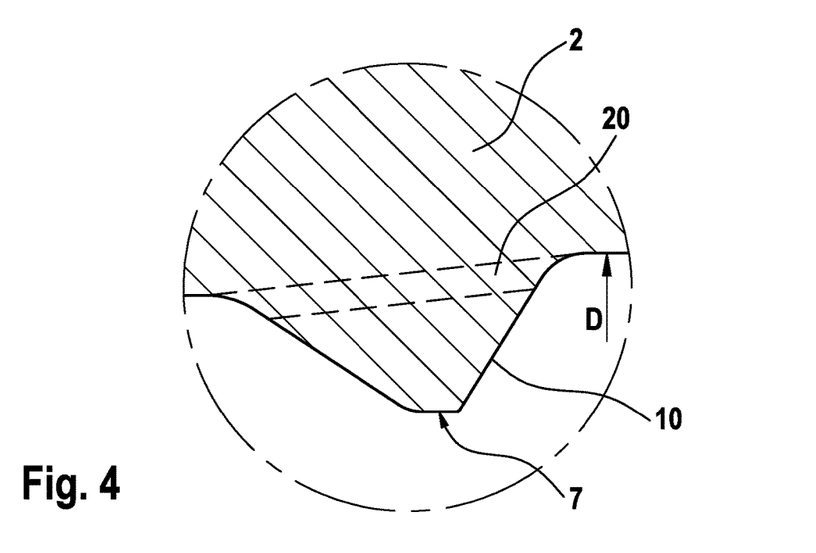
FIG. 4 shows just the wall bracket, enlarged as per detail IV of FIG. 3.

FIGS. 2-4 clarify further details of a novel brake piston 1 configured according to the invention, as follows. The piston wall 2 is preferably placed axially under pressure by clamping between piston head 3 and free edge. Consequently, a triaxial stress state is induced in the metal material, which leads to the possibility of material particles moving like a fluid.

In this way, the piston wall 2 is drawn in the locally defined, cylindrical piston wall portion to be externally cylindrically smooth and groove-free. Locally in a defined region, as a result of material particle displacement, the piston wall forms a wall portion with a one-piece wall bracket 7, which protrudes radially towards the piston longitudinal axis A and in principle annularly peripherally in such a way that the wall thickness s2 in the piston wall portion of the wall bracket 7 is increased by a multiple in a locally defined area. This indication of wall thickness difference applies in each case in relation to the smallest piston wall thickness s1 in the piston wall portion which lies laterally to the side of the thickened wall bracket 7, i.e. is arranged laterally offset relative thereto. The laterally offset piston wall portions may, in direct comparison with one another, have freely different or identically matching wall thicknesses s1, s3. In any event, these wall portions are thinner than the thickening. The size of the thickened wall portion with the wall thickness s2 is here by way of example preferably in a range of, substantially roughly, 0.1-10 times an unthickened "control wall thickness" s11. By way of amplification, the following guideline is stated in each case per se or in combination for the mutual relationships, ratios and sizes of the wall thicknesses: 1) Sb corresponds roughly to the starting strip thickness So and is less than S2; b) S3 is roughly equal to or greater than S1; c) S2 is greater than S3; d) Sn is roughly equal to or less than S1.

In one preferred embodiment, the thickened wall bracket 7 is set up and determined to incorporate an interface for the parking brake actuator system. In this respect, the wall bracket 7 has at least one flank 10 with a conicity or convexity. Laterally to the side of the thickened wall bracket 7, and offset towards the piston head 2 transversely of the piston longitudinal axis A, in the preferred variant a radially inwardly roller-burnished-in groove 8 with a wall thickness sn is impressed into the piston wall 2 in such a way that the piston wall 2 forms a protrusion 11 towards piston longitudinal axis A. The wall bracket 7 and the adjacent protrusion 11 are of different heights. Accordingly, these project, when viewed in the radial direction R, in each case to different depths into the piston interior 5 (towards the piston longitudinal axis A). The protrusion 11 may be equal to, smaller than or greater than the wall bracket 7.

Production proceeds in a first solution by extrusion, as shown in rudimentary terms in FIG. 2, in that a cylindrical piston wall 2 of a cup-shaped, cold-worked brake piston blank is clamped, for shaping of a locally definedly thickened brake piston wall portion with wall bracket 7 in the piston interior 5, between piston head 3 and free edge 12, in the axial direction ax parallel to the piston longitudinal axis A under tensile and/or compressive stress (extrusion). Female/male extrusion die parts, slide, counter- or blank holder, pressure pad, impression dies and other possible add-ons and components are omitted for the sake of simplicity.

Figure 5:
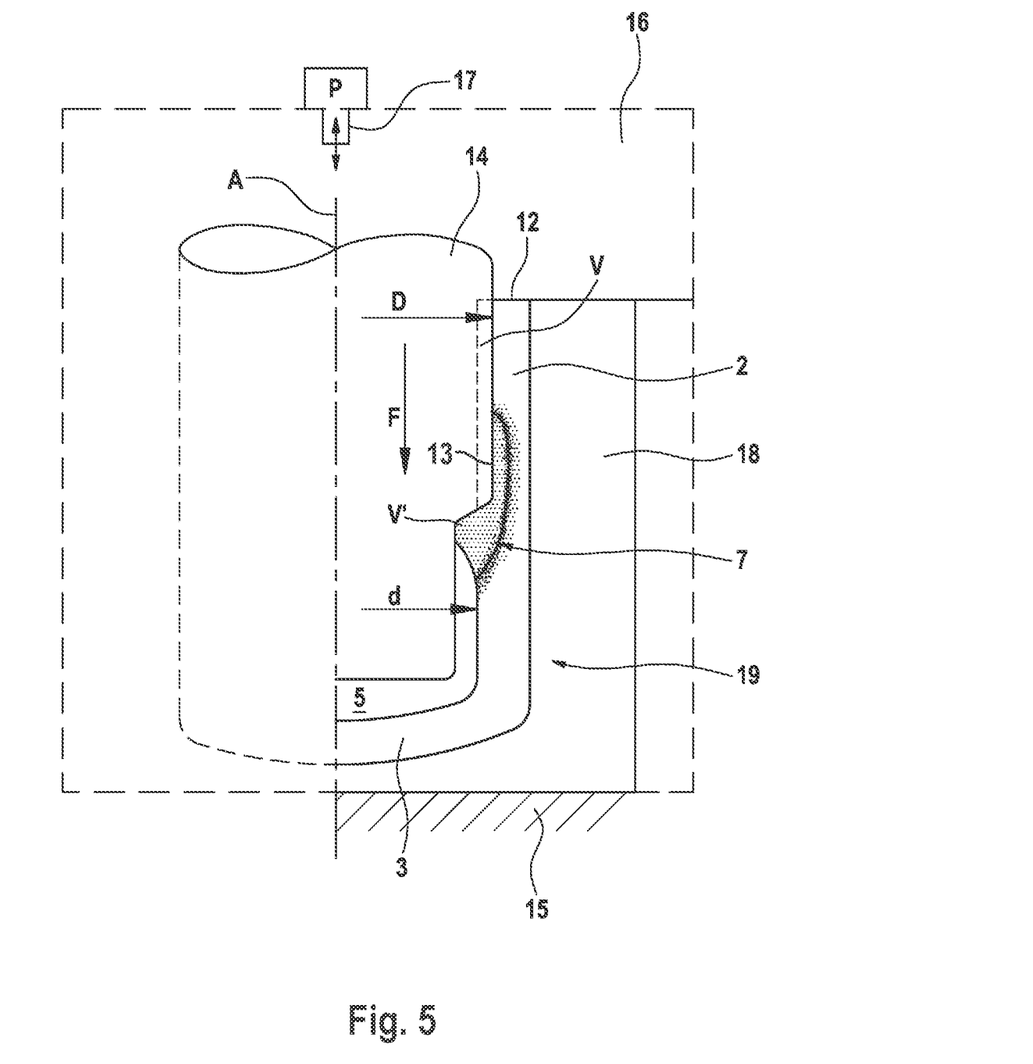
FIG. 5 is a schematically simplified illustration of method, device and kinematics according to an embodiment with associated device structure using a mandrel to form a thickened wall bracket.

Reference will be made concomitantly below to FIG. 5. This other production process is likewise based on the further processing of a cup-shaped, cold-worked brake piston blank. In this respect, an external diameter D of a step 13 on a translationally displaceably and guidedly mounted mandrel 14 is made to be excessive in respect of an internal diameter d in the piston interior 5 of a fixedly mounted, cup-shaped brake piston blank. The mandrel 14 is introduced with its step 13 (die) translationally and coaxially to the piston longitudinal axis A into the piston interior 5 of the brake piston blank. In this way, the step 13 acts like a stretch-forming die/material displacement tool and throws up a locally definedly thickened brake piston wall portion, including wall bracket 7, in the piston interior 5 in the manner of a bow wave.

FIG. 5 shows a work table 15 of the workspace 16 of a microprocessor-controlled hydraulic press P with a ram 17 guided translationally reversibly in the workspace 16 with force/stroke or force/speed control. A female extrusion die part 18 is fixed on the work table 15. The female extrusion die part 18 serves to mount and clamp the cup-shaped, cold-worked brake piston blank 19. As a result of advance of the mandrel 14 which is translationally and axially relatively displaceably guided by means of a ram guide, a local thickening and/or wall bracket 7 is thrown up in the piston interior 5. In this process, the mandrel 14 is introduced in controlled and metered manner into the piston interior 5 of the brake piston blank 19 under varied force/stroke control, or force/speed control.

Figure 7:
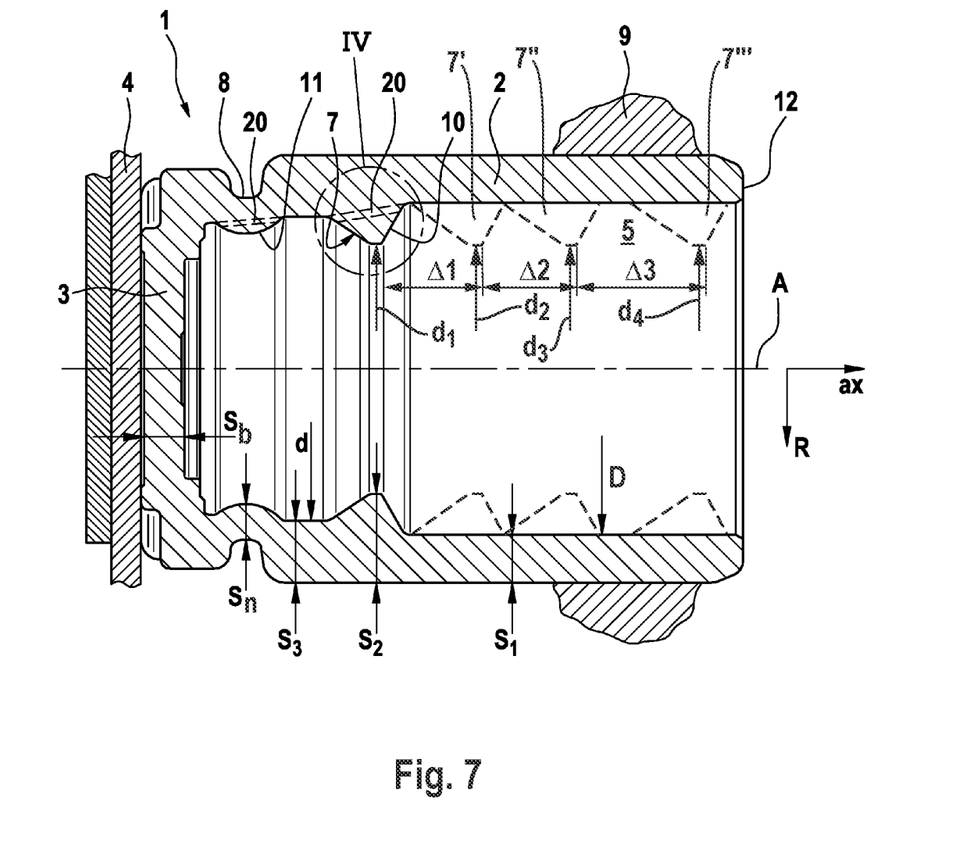
FIG. 7 is a schematic illustration of a brake piston as in FIG. 3 but with a piston wall forming a plurality of wall brackets according to an example embodiment of the invention.
Figure 8:
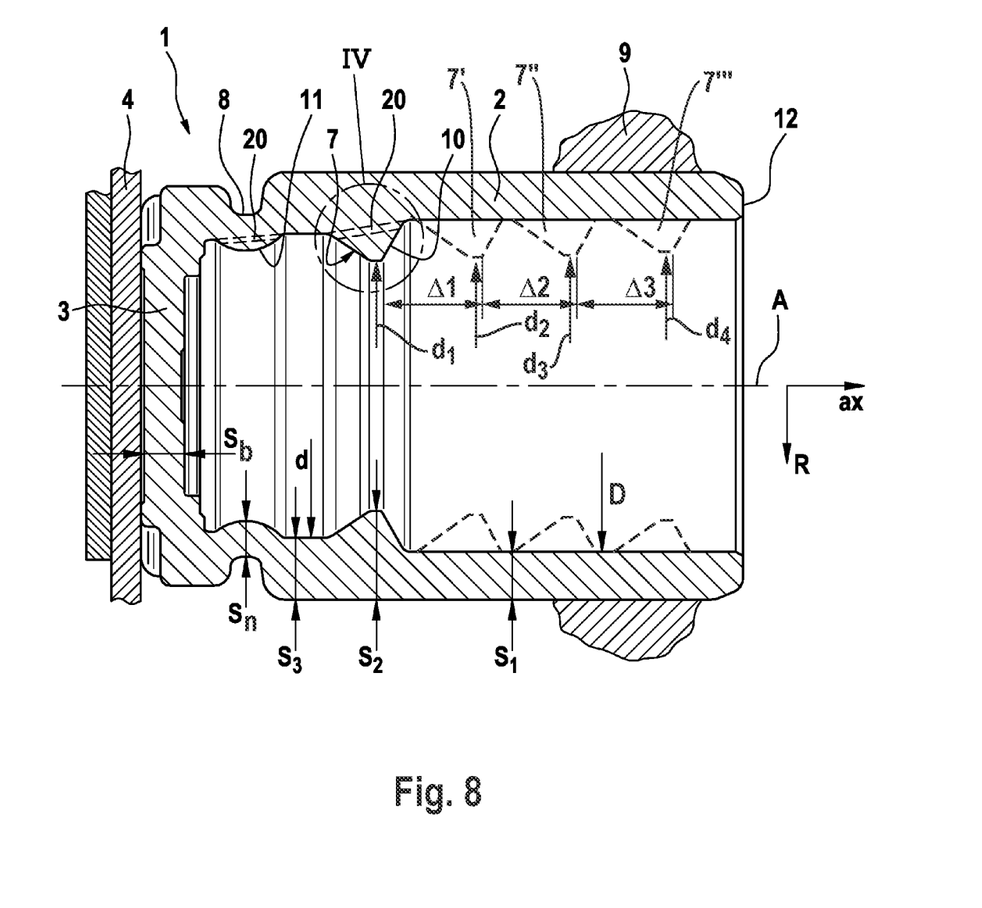
FIG. 8 is a schematic illustration of a brake piston as in FIG. 3 but with a piston wall forming a plurality of wall brackets according to another example embodiment of the invention.

If necessary, the piston wall 2 is provided with a plurality of thickened portions or wall brackets 7, which are arranged next to one another and thus at a distance from one another. It is possible for these portions or brackets to be of cascaded diameter. To achieve this in a single operation with one tool, the mandrel 14 may have a plurality of appropriately cascaded steps 13, which are each provided spaced axially one behind the other. An example brake piston 1 with a piston wall 2 forming a plurality of wall brackets 7, 7', 7", 7''' spaced next to one another is schematically illustrated in FIG. 7. The spacing between the wall brackets can be different, as illustrated by spacings Δ1, Δ2, and Δ3, but the spacing may be identical. FIG. 8 is a schematic illustration of another example brake piston 1 with a piston wall 2 forming a plurality of wall brackets 7, 7', 7", 7''' spaced next to one another in a cascaded manner. Unlike the example shown in FIG. 7, the plurality of wall brackets in FIG. 8 have identical spacing but different diameters d1, d2, d3, d4 relative to one another, wherein the different diamters thereof reduce as they become increasingly close to the piston head 3.

Figure 6:
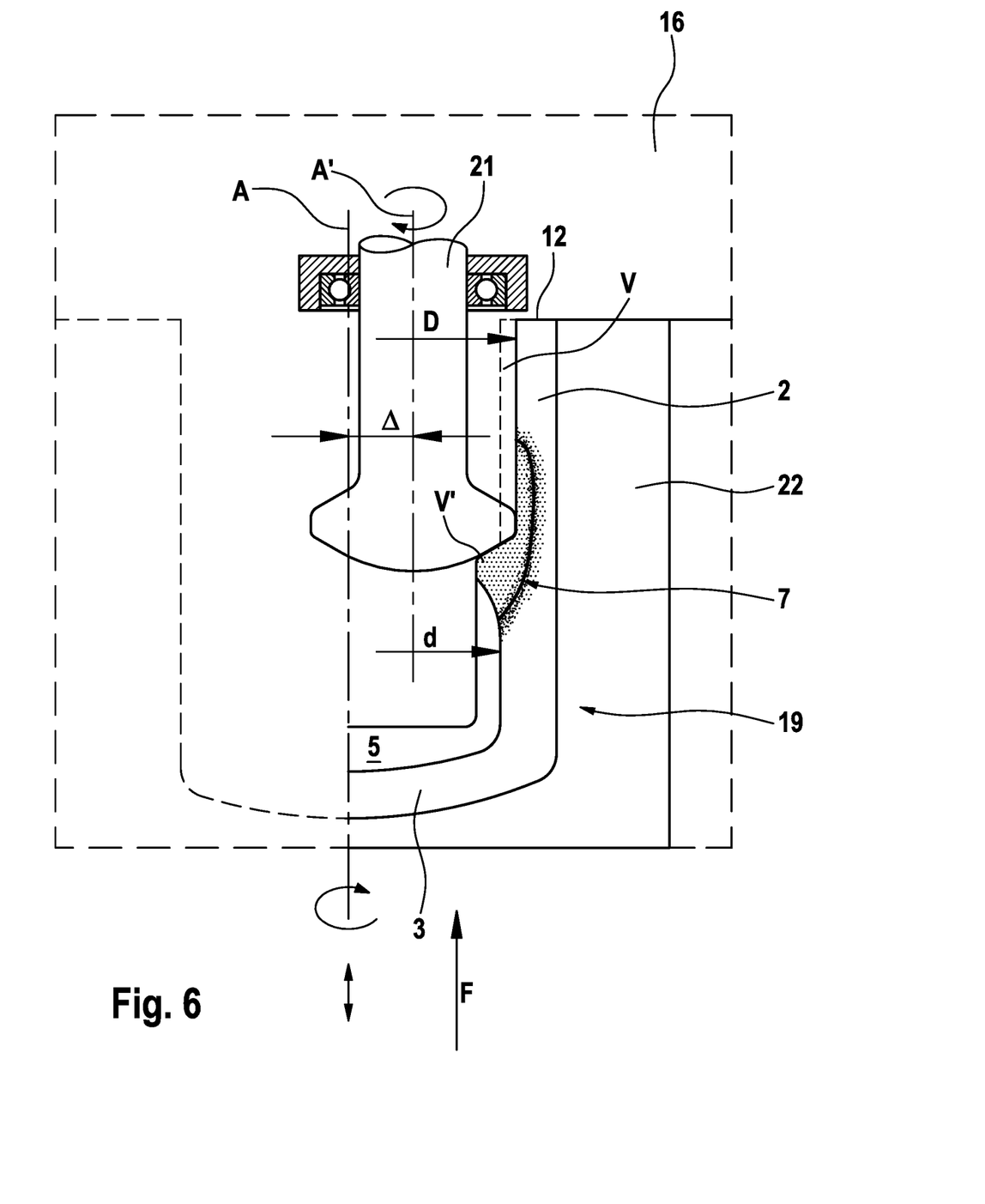
FIG. 6 is a schematically simplified depiction of an alternative manufacturing process, comprising a freely rotatably mounted inner roller-burnishing tool and firm external clamping of the brake piston blank, the clamping device performing not only the rotational drive but also the advance motion and the infeed motion relative to the roller-burnishing tool.

As an alternative to the deep-drawing-like internal machining with mandrel 14, it is possible to produce a profiled, rotationally symmetrical inner contour by roller-burnishing with the aid of an eccentrically rotatingly mounted (axis A', axial offset Δ) roller-burnishing tool 21 acting radially outwards on the internal wall. In this case, the wall thickness variation, or material displacement, is produced substantially by a coordinatedly controlled advance and infeed motion between the off center, rotatably arranged roller-burnishing tool 21 and the brake piston blank 19 in conjunction with an appropriately matching pressure force modulation. In this connection FIG. 6 clarifies by way of example a corresponding method with roller-burnishing tool 21 for internal roller-burnishing of the pot-shaped, metallic brake piston blank 19. Accordingly, a freely rotatably mounted internal roller-burnishing tool 21 is arranged off center in a workspace 16 (axial offset Δ). The roller-burnishing tool may be present as a loose, freely rotatably mounted roller, which may be fed radially outwardly. The pot-shaped, preferably deep-drawn, brake piston blank 19 is fixed in a clamping device 22 in accordance with the piston longitudinal axis A, i.e. externally clamped. The clamping device 19 here performs a rotational rotary drive motion and an infeed motion and also the advance motion in relation to the off center roller-burnishing tool 21. One advantage of this arrangement consists in the fact that the roller-burnishing tool is fixed, i.e. does not undergo any adjusting motion, whereas only the clamping device performs a rotary drive motion and infeed and advance motion. As explained above, it is however possible, if desired, for an infeed and/or advance motion to be performed by the roller-burnishing tool 21 while the brake piston blank is rotated in its clamping device 22, without going beyond the central idea.

LIST OF REFERENCE SIGNS

1 Brake piston
2 Piston wall
3 Piston head
4 Back plate
5 Piston interior
6 Cup
7 Wall bracket
8 Groove
9 Brake caliper
10 Flank
11 Protrusion
12 Edge
13 Step
14 Mandrel
15 Work table
16 Workspace
17 Ram
18 Female extrusion die part
19 Brake piston blank
20 Venting duct
21 (Internal) roller-burnishing tool
22 Clamping device
A Piston longitudinal axis
A' Axis (roller-burnishing tool 21)

ax Axial direction
R Radial direction
F (Pressure) force
$S_0$-$s_x$ Wall thickness
V,V' Material volume
D,d Diameter
P Press
Δ Axial offset (off center arrangement between brake piston blank 19 and roller-burnishing tool 21)

The invention claimed is:

1. A brake piston for a brake caliper of a disk brake, the brake piston produced using working processes from a metallic material and configured in one piece as a unilaterally open pot with a piston longitudinal axis A, with a piston wall and with a piston head, wherein at least one locally defined, i.e. partially cold-upset or partially ironed, externally cylindrical, smooth piston wall portion of a brake piston is provided with a partially deformed piston wall which is configured in an adaptively modified manner by plastic material deformation by means of material redistribution (flow) including strain-hardening of its piston wall thickness;
wherein a) the piston wall is drawn in the cylindrical piston wall portion in a locally defined manner to be smooth and groove-free, in that b) the partially deformed piston wall forms a wall bracket shaped in one piece, which wall bracket protrudes radially towards the piston longitudinal axis A and annularly peripherally in such a way that c) a piston wall thickness S2 is increased in the piston wall portion of the wall bracket in a locally defined manner by a multiple, d) in relation to a wall thickness S1 in a piston wall portion which is arranged laterally offset to the side of the thickened wall bracket;
wherein the thickened wall bracket incorporates an interface for a parking brake actuator system; and
wherein the wall bracket includes a plurality of wall brackets spaced next to one another in a cascaded manner.

2. The brake piston for a brake caliper as claimed in claim 1, wherein the piston wall thickness S1, S3 of the two piston wall portions adjacent the thickened wall bracket is substantially matching.

3. The brake piston for a brake caliper as claimed in claim 1, wherein the wall bracket exhibits conicity over at least one flank.

4. The brake piston for a brake caliper as claimed in claim 1, wherein the wall bracket exhibits convexity over at least one flank.

5. The brake piston for a brake caliper as claimed in claim 1, wherein the spacing between the wall brackets is identical.

6. The brake piston for a brake caliper as claimed in claim 1, wherein the spacing between the wall brackets is different.

7. The brake piston for a brake caliper as claimed in claim 1, wherein the various wall brackets have different diameters relative to one another, wherein the different diameters thereof reduce as they become increasingly close to the piston head (cascading).

8. The brake piston for a brake caliper as claimed in claim 1, wherein each wall bracket and/or protrusion forms at least one axially oriented venting duct.

9. The brake piston for a brake caliper as claimed in claim 8, wherein each wall bracket and/or protrusion has a plurality of venting ducts arranged peripherally and offset relative to one another.

10. The brake piston for a brake caliper as claimed in claim 9, wherein the venting ducts are provided distributed regularly over each annular wall bracket and/or protrusion with identical offset relative to one another.

11. The brake piston for a brake caliper as claimed in claim 1, wherein laterally to the side of the thickened wall bracket, and offset towards the piston head transversely of the piston longitudinal axis A, a radially inwardly roller-burnished-in groove with unthickened piston wall thickness sn is impressed into the piston wall in such a way that the piston wall forms a protrusion towards piston longitudinal axis A.

12. The brake piston for a brake caliper as claimed in claim 11, wherein the wall bracket and the protrusion project in the radial direction R in each case to different depths into the piston interior.

13. The brake piston for a brake caliper as claimed in claim 11, wherein the protrusion is of smaller configuration than the adjacent wall bracket.

14. The brake piston for a brake caliper as claimed in claim 1, wherein the piston wall thickness includes the following features, in each case per se or in any desired combination: a) a wall thickness Sb corresponds roughly to the wall thickness So and is less than S2; b) S3 is roughly equal to or greater than S1; c) S2 is greater than S3; d) a wall thickness Sn is roughly equal to or less than S1.

15. A brake piston for a brake caliper of a disk brake, the brake piston produced using working processes from a metallic material and being configured in one piece as a unilaterally open pot with a piston longitudinal axis A, with a piston wall and with a piston head, wherein at least one locally defined, i.e. partially cold-upset or partially ironed, cylindrical, smooth piston wall portion of the brake piston is provided with a partially deformed piston wall which is configured in an adaptively modified manner by plastic material deformation by means of material redistribution (flow) including strain-hardening of its piston wall thickness;
wherein a) the piston wall is drawn in the cylindrical piston wall portion in a locally defined manner to be smooth and groove-free, in that b) the partially deformed piston wall forms a plurality of wall brackets shaped in one piece, wherein each wall bracket protrudes radially towards the piston longitudinal axis A and annularly peripherally in such a way that c) a piston wall thickness S2 is increased in the piston wall portion of the wall bracket in a locally defined manner by a multiple, d) in relation to a wall thickness S1 in a piston wall portion which is arranged laterally offset to the side of the thickened wall bracket; and
wherein the wall brackets are spaced next to one another in a cascaded manner.

16. A brake piston for a brake caliper of a disk brake, the brake piston produced using working processes from a metallic material and being configured in one piece as a unilaterally open pot with a piston longitudinal axis A, with a piston wall and with a piston head, wherein at least one locally defined, i.e. partially cold-upset or partially ironed, cylindrical, smooth piston wall portion of the brake piston is provided with a partially deformed piston wall which is configured in an adaptively modified manner by plastic material deformation by means of material redistribution (flow) including strain-hardening of its piston wall thickness;
wherein a) the piston wall is drawn in the cylindrical piston wall portion in a locally defined manner to be smooth and groove-free, in that b) the partially deformed piston wall forms a wall bracket shaped in one piece, which wall bracket protrudes radially towards the piston longitudinal axis A and annularly peripherally in such a way that c) a piston wall thickness $S2$ is increased in the piston wall portion of the wall bracket in a locally defined manner by a multiple, d) in relation to a wall thickness $S1$ in a piston wall portion which is arranged laterally offset to the side of the thickened wall bracket; and wherein each wall bracket and/or protrusion forms at least one axially oriented venting duct.

* * * * *

UNITED STATES PATENT AND TRADEMARK OFFICE
CERTIFICATE OF CORRECTION

PATENT NO. : 11,614,135 B2
APPLICATION NO. : 16/619398
DATED : March 28, 2023
INVENTOR(S) : Uwe Bach et al.

It is certified that error appears in the above-identified patent and that said Letters Patent is hereby corrected as shown below:

In the Claims

In Column 7, Claim 1, Lines 17-18, delete "externally";

In Column 8, Claim 14, Line 24, delete "the" and insert --a--;

In Column 8, Claim 14, Line 24, insert --a wall thickness-- before "S3"; and

In Column 8, Claim 15, Line 35, delete "modifed" and insert --modified--.

Signed and Sealed this
Thirtieth Day of May, 2023

Katherine Kelly Vidal
*Director of the United States Patent and Trademark Office*